(12) United States Patent
Adachi

(10) Patent No.: US 7,881,063 B2
(45) Date of Patent: Feb. 1, 2011

(54) NONVOLATILE MEMORY CARD AND CONFIGURATION CONVERSION ADAPTER

(75) Inventor: Masaharu Adachi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 1010 days.

(21) Appl. No.: 11/661,288

(22) PCT Filed: Jun. 9, 2006

(86) PCT No.: PCT/JP2006/312090

§ 371 (c)(1),
(2), (4) Date: Feb. 27, 2007

(87) PCT Pub. No.: WO2007/004403

PCT Pub. Date: Jan. 11, 2007

(65) Prior Publication Data

US 2008/0320206 A1    Dec. 25, 2008

(30) Foreign Application Priority Data

Jun. 30, 2005    (JP) ............................. 2005-192054

(51) Int. Cl.
*H05K 1/14* (2006.01)
(52) U.S. Cl. ...................... 361/737; 361/720
(58) Field of Classification Search ............ 361/737, 361/727, 760, 720; 711/100–103, 115, 170, 711/173
See application file for complete search history.

(56) References Cited

U.S. PATENT DOCUMENTS

| 4,926,034 | A | 5/1990 | Banjo et al. |
| 5,745,102 | A * | 4/1998 | Bloch et al. ................. 345/530 |
| 6,476,817 | B1 * | 11/2002 | Harper et al. ............... 345/530 |
| 6,616,053 | B2 * | 9/2003 | Kondo et al. ................ 361/737 |
| 7,535,718 | B2 * | 5/2009 | Le ............................. 361/737 |
| 2003/0116624 | A1 * | 6/2003 | Chen ......................... 235/441 |
| 2004/0070952 | A1 | 4/2004 | Higuchi et al. |

FOREIGN PATENT DOCUMENTS

| JP | 63-239095 A | 10/1988 |
| JP | 2002-158992 | 6/1990 |
| JP | 05-074527 | 3/1993 |
| JP | 2002-32715 | 1/2002 |
| JP | 2002-73522 | 3/2002 |
| JP | 2003-186582 | 7/2003 |
| JP | 2003-196603 | 7/2003 |
| JP | 3102396 | 3/2004 |
| JP | 2004-252672 | 9/2004 |
| JP | 2005-108525 | 4/2005 |
| WO | WO 01/84490 | 11/2001 |
| WO | WO 2004/034318 A1 | 4/2004 |

* cited by examiner

*Primary Examiner*—Hung S Bui
(74) *Attorney, Agent, or Firm*—Dickstein Shapiro LLP (57) ABSTRACT

A nonvolatile memory card, including interface parts for plural kinds of memory cards; interface controllers corresponding to the interface parts for corresponding memory cards; and a switch configured to select a single one of the interface controllers.

7 Claims, 12 Drawing Sheets

NONVOLATILE MEMORY CARD AND CONFIGURATION CONVERSION ADAPTER

TECHNICAL FIELD

The present invention relates to nonvolatile memory cards and configuration conversion adapters.

BACKGROUND ART

A nonvolatile memory card having a flash memory or the like has been used as information transmission means in digital equipment such as a portable phone, digital camera, PC (Personal Computer) and printer.

For example, Multi Media Card (Registered Trademark), SD Card (Registered Trademark), Mini SD Card (Registered Trademark), xD-Picture Card (Registered Trademark), Memory Stick (Registered Trademark), Compact Flash (Registered Trademark), Micro SD (Registered Trademark), Trans Flash (Registered Trademark), Memory Stick Pro (Registered Trademark), Memory Stick Duo (Registered Trademark), Memory Stick Pro Duo (Registered Trademark), and others are used as the nonvolatile memory card.

However, the nonvolatile memory cards do not have mutual compatibilities in control method, communication method, electric properties, card insert stand configuration, and others. Hence, a certain nonvolatile memory card cannot be used in the card insert stand prepared for another nonvolatile memory card.

More specifically, a conventional nonvolatile memory card has only a single nonvolatile memory card controller and does not have compatibility with a nonvolatile memory card host controller of a different standard. Accordingly, the conventional nonvolatile memory card does not have a nonvolatile memory card controller switch. In addition, the conventional nonvolatile memory card has only a single kind of interface.

Furthermore, only is a nonvolatile memory card having a certain configuration can be inserted in a card insert stand of a host device of a nonvolatile memory card having a certain standard.

Therefore, even if configuration compatibility for a nonvolatile memory card is achieved by using a configuration conversion adapter and thereby the card can be inserted in the card insert stand of the nonvolatile memory card host device having a certain standard, when standards such as control methods, communication methods, electric properties, or the like are different, it is not possible for the nonvolatile memory card to perform data transmission with the nonvolatile memory card host device.

Japanese Laid Open Patent Application Publication No. 2002-32715 discloses an adapter where plural kinds of memory cards can be exclusively loaded. A device selecting the memory card is not loaded in the adapter. Japanese Laid Open Patent Application Publication No. 2003-196603 discloses a button type card taking-put mechanism. Japanese Laid Open Patent Application Publication No. 2002-73522 discloses an interface conversion of a small size memory card. Japanese Laid Open Patent Application Publication No. 2003-186582 discloses card detection and card recognition of a PC card. Japanese Utility Model Registration No. 312396 discloses a memory adapter. The adapter does not have a device configured to switch a memory card controller of a memory card.

DISCLOSURE OF THE INVENTION

Accordingly, in a preferred embodiment of the present invention there is provided a novel and useful nonvolatile memory card and configuration conversion adapter solving one or more of the problems discussed above.

According to one aspect of the present invention there is provided an integrated memory card which can be used in the host device of plural kinds of memory cards by using a configuration conversion adapter.

An embodiment of the present invention is achieved by a nonvolatile memory card, including: interface parts for plural kinds of memory cards; interface controllers corresponding to the interface parts for corresponding memory cards; and a switch configured to select a single one of the interface controllers.

In The nonvolatile memory card, at least a single setting portion of the plural kinds of the interface parts may be hollowed out from a surface of a main body of the memory card.

The nonvolatile memory card may further include a protection plate for at least a single one of the interface parts; wherein the protection plate is slid by an internal structure of a configuration conversion adapter and exposes the interface when a main body of the memory card is inserted in the configuration conversion adapter; and the protection plate is energized by the protection plate itself and an upper surface of the main body of the memory card so as to hide the interface when the main body of the memory card is not inserted in the configuration conversion adapter.

A claw hook projection may be formed as corresponding to a cut-off part of a configuration conversion adapter; the configuration conversion adapter including: the cut-off part configured to receive the claw hook projection for assisting attachment or detachment of an interface part a certain kind of a memory card; wherein the adapter may be used for an interface part for a different kind of the memory card of the nonvolatile memory card; the nonvolatile memory card including: interface parts for plural kinds of memory cards; interface controllers corresponding to the interface parts for corresponding memory cards; and a switch configured to select a single one of the interface controllers.

An embodiment of the present invention is achieved by a configuration conversion adapter, including: a cut-off part configured to expose a claw hook concave part when a nonvolatile memory card is inserted; the nonvolatile memory card including interface parts for plural kinds of memory cards; interface controllers corresponding to the interface parts for corresponding memory cards; and a switch configured to select a single interface controller; wherein at least a single setting portion of the plural kinds of the interface parts is hollowed out from a surface of a main body of the memory card and a concave part is formed on a surface so that the main body of the memory card can be taken in or out of a configuration conversion adapter at the time of use.

An embodiment of the present invention is achieved by a configuration conversion adapter, including: a switch selector configured to control a switch of a nonvolatile memory card; the nonvolatile memory card including interface parts for plural kinds of memory cards; and interface controllers corresponding to the interface parts for corresponding memory cards; wherein the switch selects a single interface controller.

An embodiment of the present invention is achieved by a configuration conversion adapter, including: a cut-off part configured to receive a claw hook projection for assisting attachment or detachment of an interface part for a certain kind of a memory card; wherein the adapter is used for an interface part for a different kind of the memory card of a nonvolatile memory card; the nonvolatile memory card including: interface parts for plural kinds of memory cards; interface controllers corresponding to the interface parts for corresponding memory cards; and a switch configured to select a single interface controller.

According to the above-mentioned embodiments, it is possible to provide the integrated memory card which can be used in the host devices of plural kinds of memory cards by using the configuration conversion adapter.

By using the memory card and the configuration conversion adapter of the present invention, it is possible to use a single memory card in plural kinds of the host devices safely and easily.

Other objects, features, and advantages of the present invention will become more apparent from the following detailed description when read in conjunction with the accompanying drawings.

BEST MODE FOR CARRYING OUT THE INVENTION

A description of the present invention and details of drawbacks of the related art are now given, with reference to FIG. 1 through FIG. 15, including embodiments of the present invention.

First Embodiment

Figure 1:
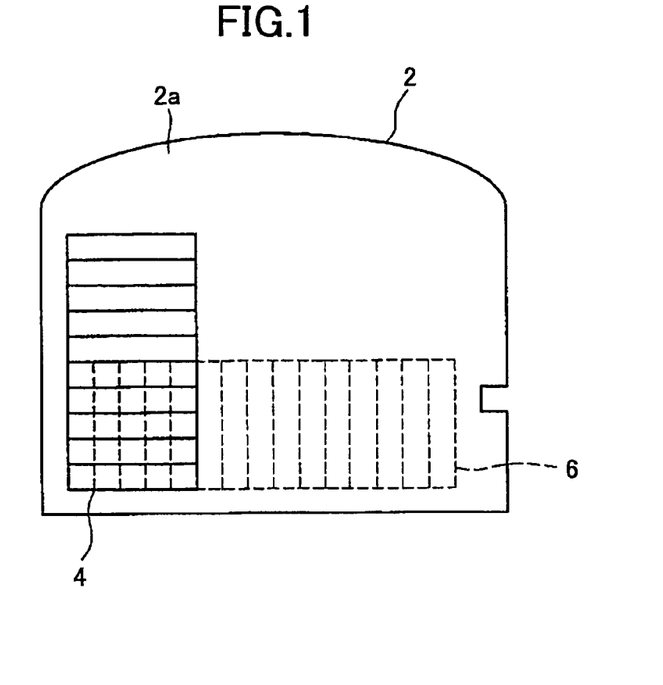
FIG. 1 is a plan view of a nonvolatile memory card of a first embodiment of the present invention.

FIG. 1 is a plan view of a nonvolatile memory card 2 of a first embodiment of the present invention. The nonvolatile memory card 2 of the first embodiment of the present invention has a configuration of an XD picture card (hereinafter "XD card"). In the nonvolatile memory card 2, an XD card interface 6 is provided on a surface forming the memory card 2.

In addition, in the nonvolatile memory card 2 of the first embodiment of the present invention, an interface for an SD card and an interface for Memory Stick (MS) are provided on a rear part of the surface where the XD card interface 6 is provided. The interface for an SD card and the interface for a Memory Stick (MS) are formed by a common part as an SD·MS interface 4.

For convenience in the following explanation, the surface where the SD·MS interface 4 is provided is called an "upper surface" and the surface where the XD card interface is provided in called a "lower surface". However, the present invention is not limited to this example.

In addition, in the following explanation, the XD card, SD card and MS are discussed for explaining examples of configurations of cards, configuration conversion adapters, and interfaces of memory cards of the present invention. However, the present invention is not limited to these examples. Therefore, the present invention can be applied to other card configurations, configuration conversion adapter, and combinations of the interfaces.

As discussed above, the configuration of the nonvolatile memory card 2 of the first embodiment of the present invention has compatibility with the XD card. Therefore, if a host device with an XD card slot (not shown) is provided at a lower part in FIG. 1 and the nonvolatile memory card 2 is inserted in the XD card slot, data transmission between the nonvolatile memory card 2 and the host device having the XD card slot can be performed.

In addition, the SD·MS interface 4 is provided at an upper surface of the nonvolatile memory card 2 of the first embodiment of the present invention, as discussed above. Therefore, if a configuration conversion adapter having the configuration of either the SD card or MS is provided at a left side in FIG. 1 and is inserted in a host device having an SD card slot and an MS slot, it is possible to make data transmission between the nonvolatile memory card 2 and the host device. See FIGS. 9-(1) and 9-(2).

Here, the longitudinal direction of the SD·MS interface 4 is perpendicular to the longitudinal direction of the XD card interface 6. Accordingly, the direction in which the nonvolatile memory card 2 is inserted in the XD card slot is perpendicular to the direction in which the nonvolatile memory card 2 is inserted in the configuration conversion adapter. See FIG. 2.

While the SD·MS interface 4 is formed on a different surface from the XD card interface 6, the longitudinal direction of the SD·MS interface 4 may be parallel to the longitudinal direction of the XD card interface 6. In this case, a configuration conversion adapter having the configuration of either an SD card or MS is provided in the lower part in FIG. 1, and the nonvolatile memory card 2 is inserted in this configuration conversion adapter so that data transmission between the nonvolatile memory card 2 and the host device having an MS or SD card slot is performed.

In the following explanation, a case where, as shown in FIG. 1, the SD·MS interface 4 is formed on a surface different from the XD card interface 6 and the longitudinal direction of the SD·MS interface 4 is perpendicular to the longitudinal direction of the XD card interface 6, is discussed as an example.

Figure 2:
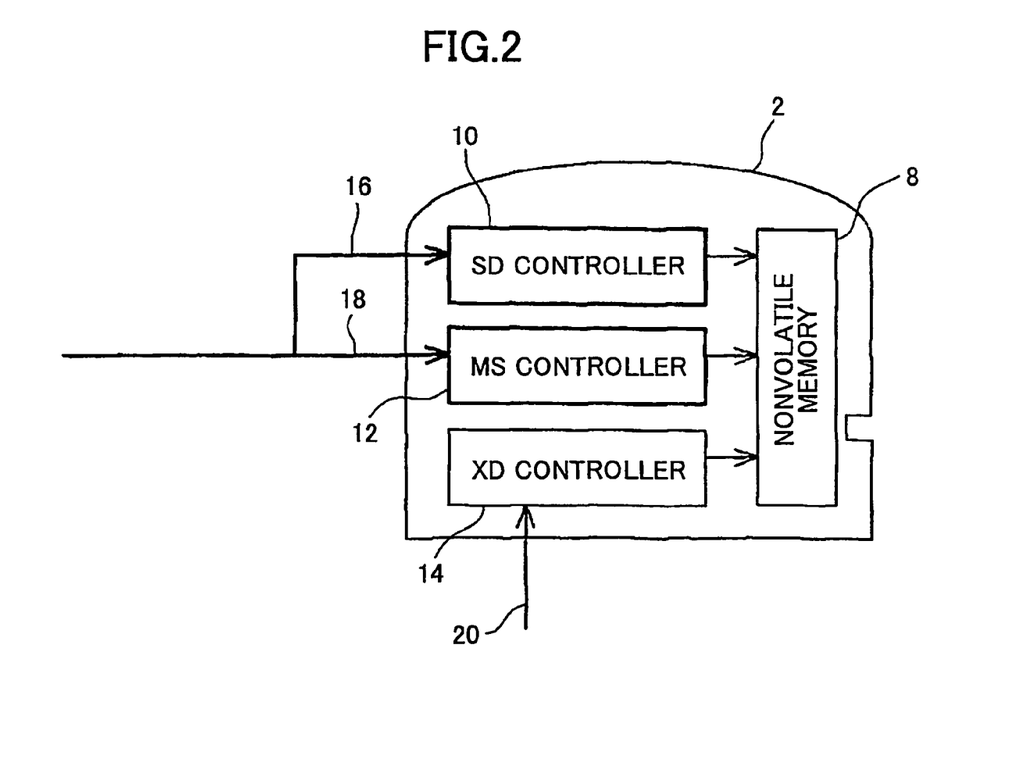
FIG. 2 is schematic block diagram of an internal circuit of the nonvolatile memory card of the first embodiment of the present invention.

FIG. 2 is schematic block diagram of an internal circuit of the nonvolatile memory card 2 of the first embodiment of the present invention.

A nonvolatile memory 8 is provided inside of the nonvolatile memory card 2. Access (16, 18) to the nonvolatile memory 8 from the SD·MS interface 4 is controlled by the SD controller 10 or the MS controller 12. In addition, access 20 from the XD interface 6 to the nonvolatile memory 8 is controlled by the XD controller 14.

Figure 3:
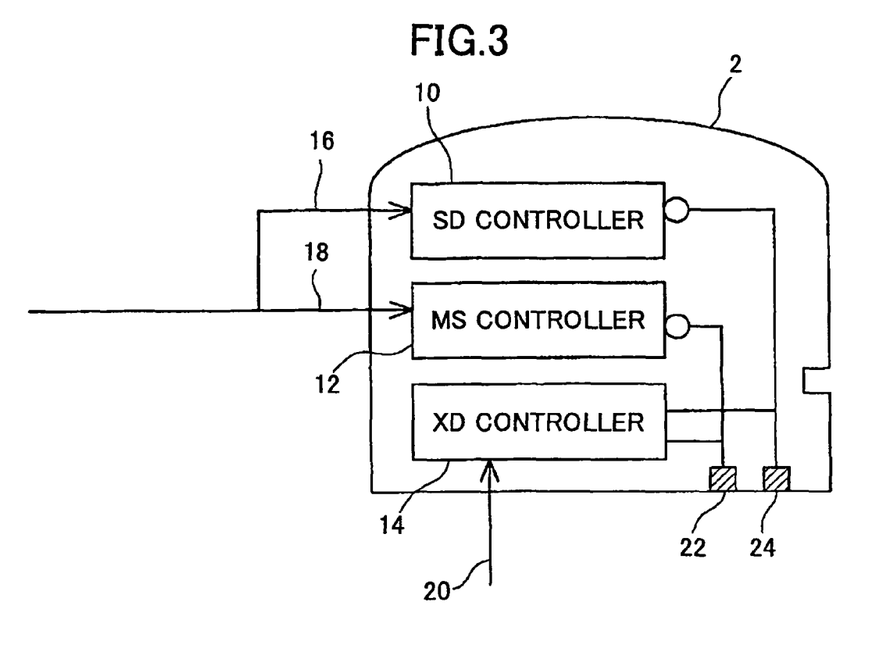
FIG. 3 is schematic block diagram of an internal circuit having interface switch of the nonvolatile memory card of the first embodiment of the present invention.

FIG. 3 is schematic block diagram of an internal circuit having interface switch of the nonvolatile memory card 2 of the first embodiment of the present invention.

The nonvolatile memory card 2 includes an MS/XD interface switch 22 and an SD/XD interface switch 24. The MS/XD interface switch 22 switches the MS and the XD interfaces. The SD/XD interface switch 24 switches the SD and the XD interfaces. The switches 22 and 24 can be switched by the configuration conversion adapters 30 and 60 as shown in FIG. 9.

Figure 9:
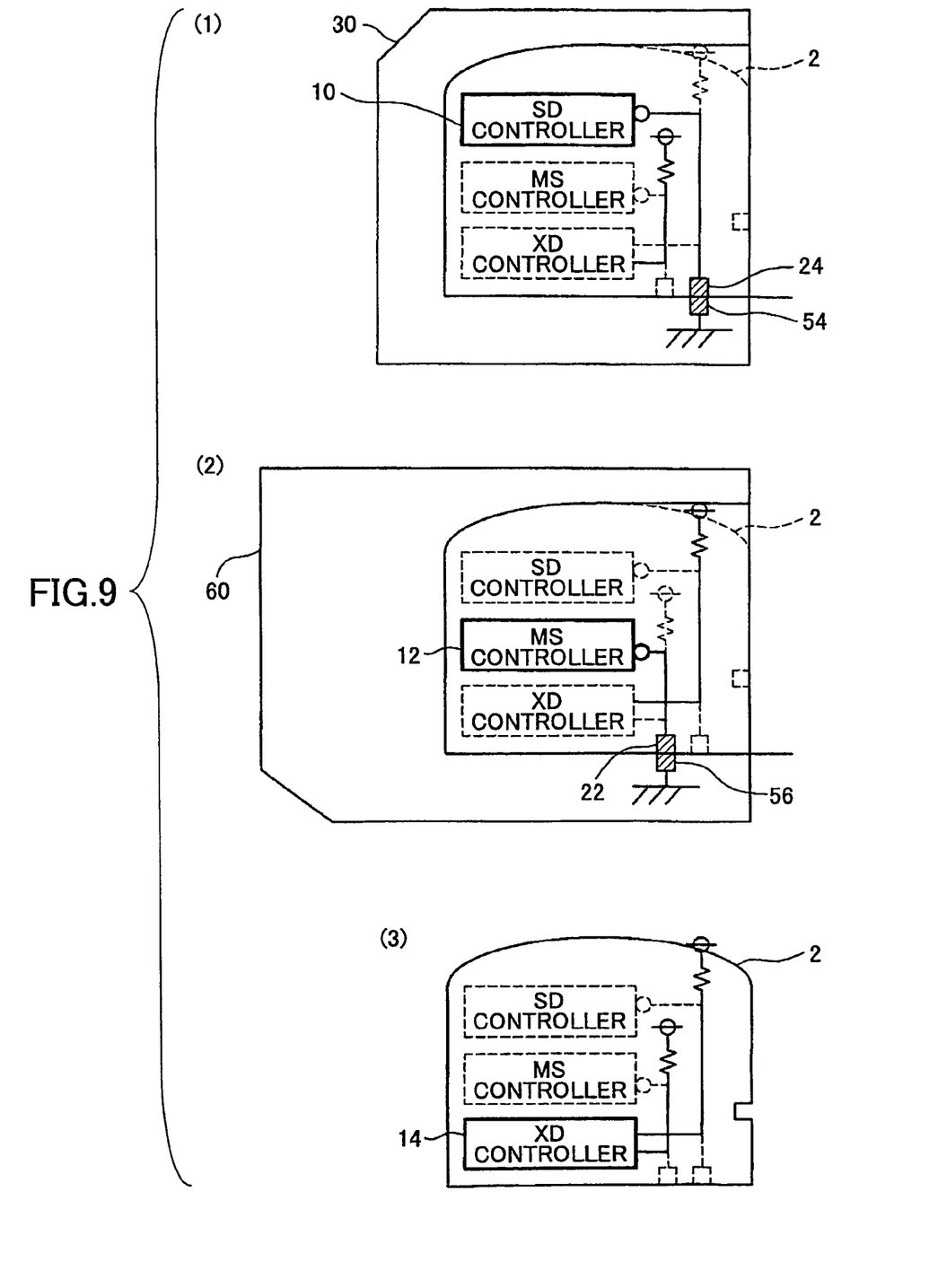
FIG. 9 is a schematic block diagram of an internal circuit having the interface switch of the nonvolatile memory card of the first embodiment of the present invention, the nonvolatile memory card being in a configuration conversion adapter.

As shown in FIG. 9-(1), the SD card conversion adapter 30 having the configuration of the SD card has an SD/XD interface switch elector 54. When the nonvolatile memory card 2 is inserted in the SD card conversion adapter 30, only the SD controller 10 is operated by a mutual operation of the SD/XD interface switch 24 and the SD/XD interface switch selector 54. In addition, as shown in FIG. 9-(2), the MS conversion adapter 60 having the configuration of the MS includes an MS/XD interface switch selector 56. When the nonvolatile memory card 2 is inserted in the MS conversion adapter 60, only the MS controller 12 is operated by a mutual operation of the MS/XD interface switch 22 and the MS/XD interface switch selector 56. In addition, as shown in FIG. 9-(3), in a state where the nonvolatile memory card 2 is not inserted in the configuration conversion adapter, a circuit is formed so that only the XD controller 14 is operated.

Therefore, in the nonvolatile memory card 2 of the first embodiment of the present invention, a proper control circuit is operated as corresponding to the way of use.

Figure 4:
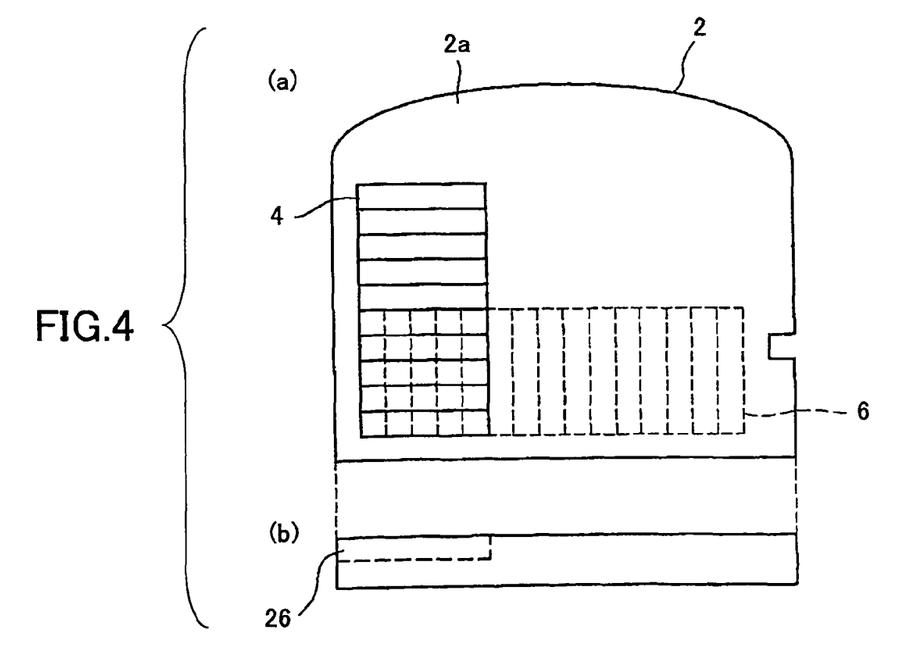
FIG. 4 is an upper surface view and side surface view of the nonvolatile memory card of the first embodiment of the present invention.

FIG. 4-(a) is an upper surface view and FIG. 4-(b) is a side surface view of the nonvolatile memory card 2 of the first embodiment of the present invention. As shown in FIG. 4-(b), it is preferable that a contact part and edge part 26 of the SD·MS interface 4 be situated in a surface hollowed out from an upper surface of the nonvolatile memory card 2. Because of this structure, in a case where the nonvolatile memory card 2 is inserted in the XD card slot, the contact part of the SD·MS interface 4 is prevented from unnecessarily coming in contact with a metal part inside of the XD card slot.

Figure 6:
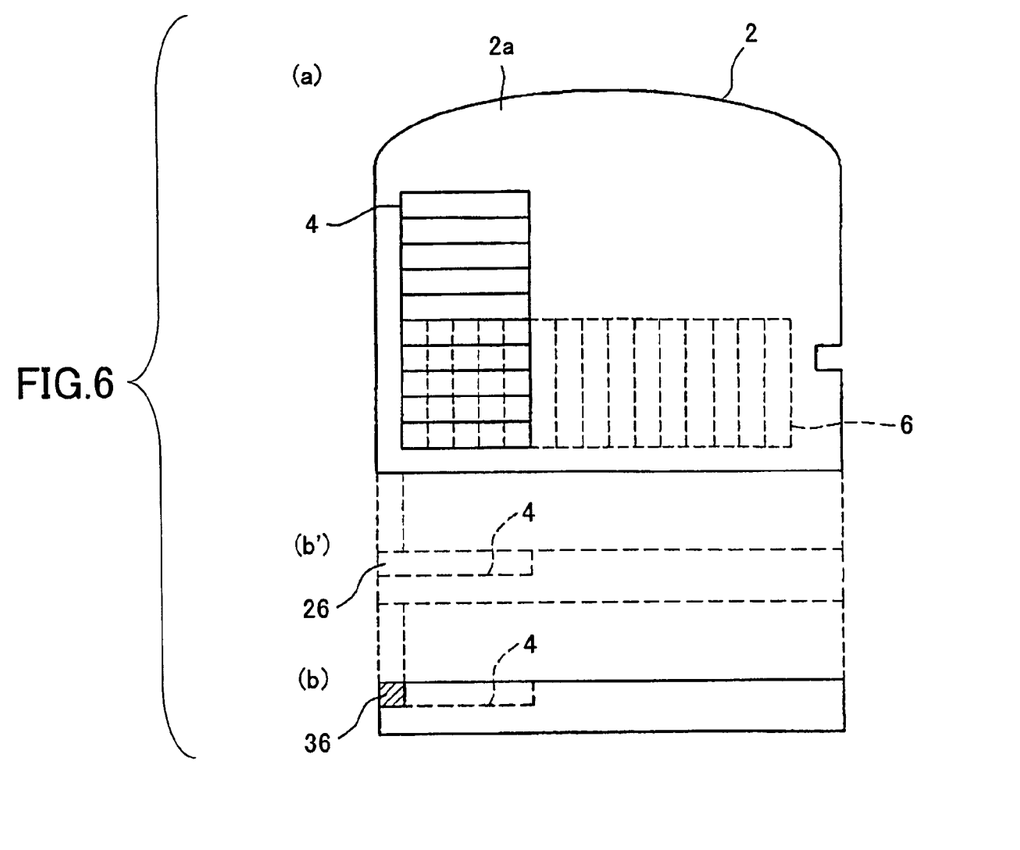
FIG. 6 is an upper surface view and side surface view of another modified example of the nonvolatile memory card of the first embodiment of the present invention.

FIG. 6-(a) is an upper surface view and FIG. 6-(b) is a side surface view of another modified example of the nonvolatile memory card 2 of the first embodiment of the present invention.

The structure shown in FIG. 6-(b') is identical to the structure shown in FIG. 4-(b). Here, as shown in FIG. 6-(b), the contact part of the SD·MS interface 4 may be hollowed out from the upper surface of the nonvolatile memory card 2 and an edge part 36 of the contact part of the SD·MS interface 4 may be maintained even with the upper surface. Because of this structure, the strength of the entire of the nonvolatile memory card 2 can be maintained.

In addition, when the nonvolatile memory card 2 is inserted in the configuration conversion adapter (30, 60), the difference in level between the hollowed out part and a (non-hollowed out) edge part may be used as a hook. At this time, the nonvolatile memory card 2 is prevented from unintentionally pulled out from the configuration conversion adapter (30, 60).

Figure 5:
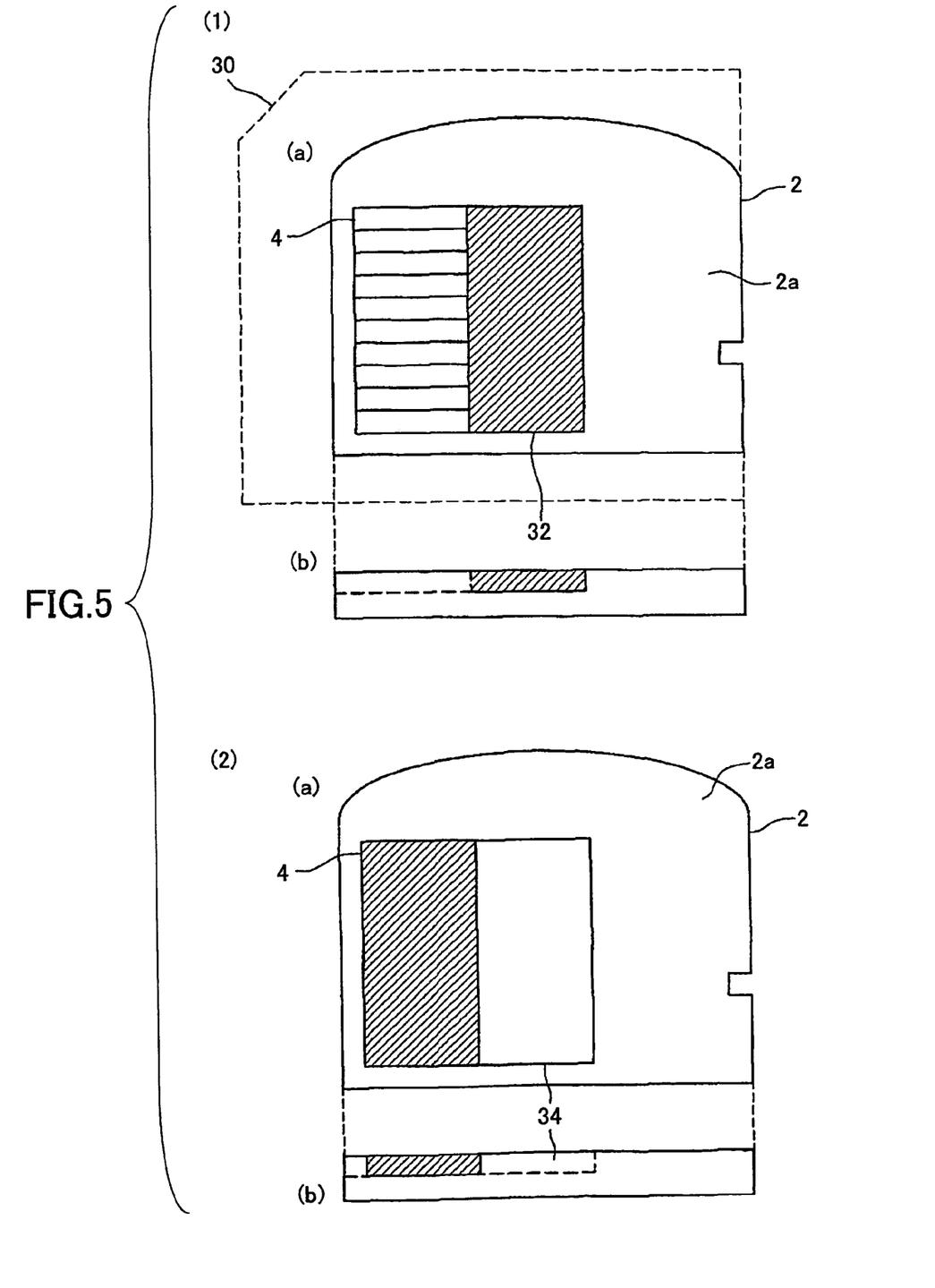
FIG. 5 is an upper surface view and side surface view of a modified example of the nonvolatile memory card of the first embodiment of the present invention.

FIG. 5 is an upper surface view and side surface view of a modified example of the nonvolatile memory card 2 of the first embodiment of the present invention.

As shown in FIG. 5-(1) and FIG. 5-(2), a protection plate 32 is provided in the SD·MS interface 4 of the nonvolatile memory card 2. The protection plate 32 can be slid on the upper surface of the nonvolatile memory card 2 so that the SD·MS interface 4 may be exposed as shown in FIG. 5-(1) and hidden as shown in FIG. 5-(2). The protection plate 32 may be slid by manual force.

When the nonvolatile memory card 2 is inserted in the configuration conversion adapter (30, 60), the protection plate 32 may be slid by an internal structure of the configuration conversion adapter (30, 60) so that the SD·MS interface 4 may be exposed as shown in FIG. 5-(1). When the nonvolatile memory card 2 is not inserted in the configuration conversion adapter (30, 60), the protection plate 32 may be energized by a structure of the upper surface of the nonvolatile memory card 2 and the protection plate 32 so that the SD·MS interface 4 may be hidden as shown in FIG. 5-(2).

Figure 7:
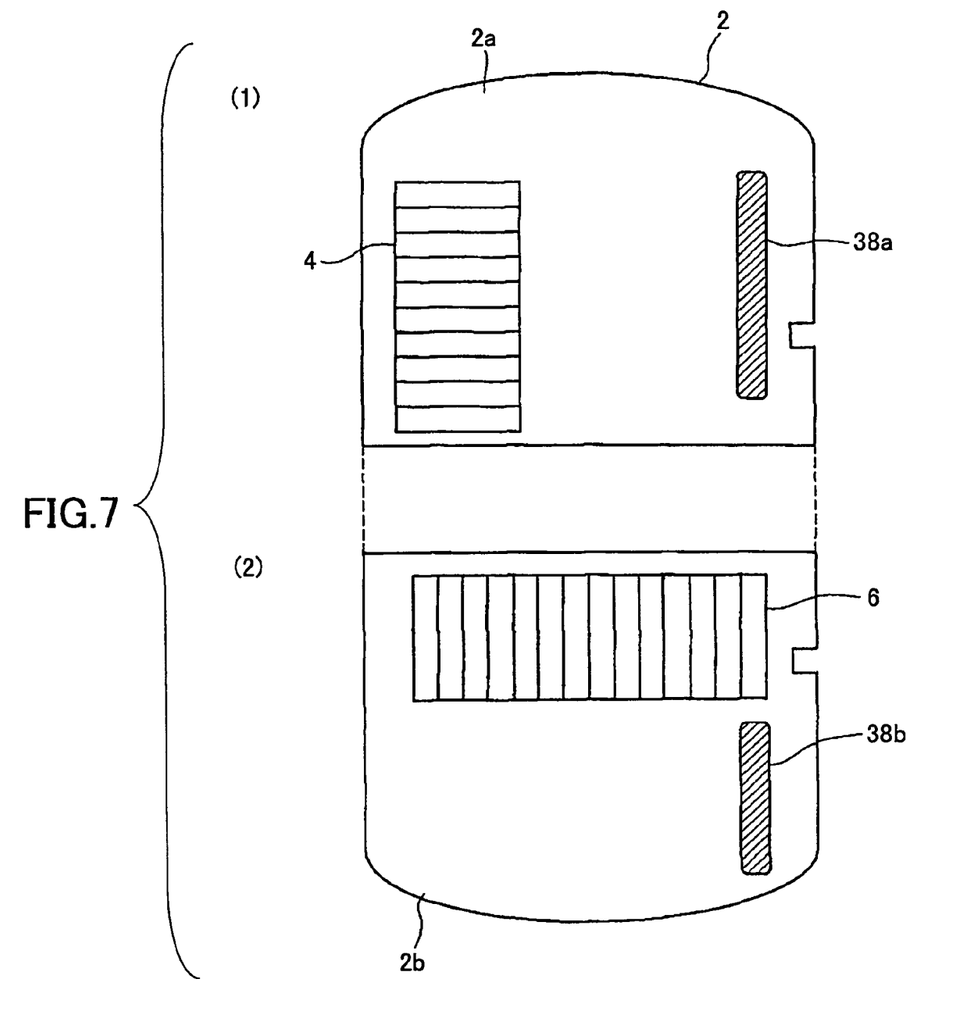
FIG. 7 is an upper surface view and side surface view of the nonvolatile memory card of the first embodiment of the present invention in a state where a claw hook concave part is provided in a direction substantially perpendicular to a direction where the volatile memory card goes in and comes out from a configuration conversion adapter.

As shown in FIG. 7-(1) and FIG. 7-(2), in the nonvolatile memory card 2 of the first embodiment of the present invention, claw hook concave parts 38a and 38b may be provided in a direction substantially perpendicular to a direction of movement going into or coming out from the configuration conversion adapters (30, 60). FIG. 7-(1) shows an upper surface of the nonvolatile memory card 2. FIG. 7-(2) shows a lower surface of the nonvolatile memory card 2. The nonvolatile memory card 2 can easily be pushed into and pulled out from the configuration conversion adapters (30, 60) by using the claw hook concave parts 38a and 38b.

Figure 8:
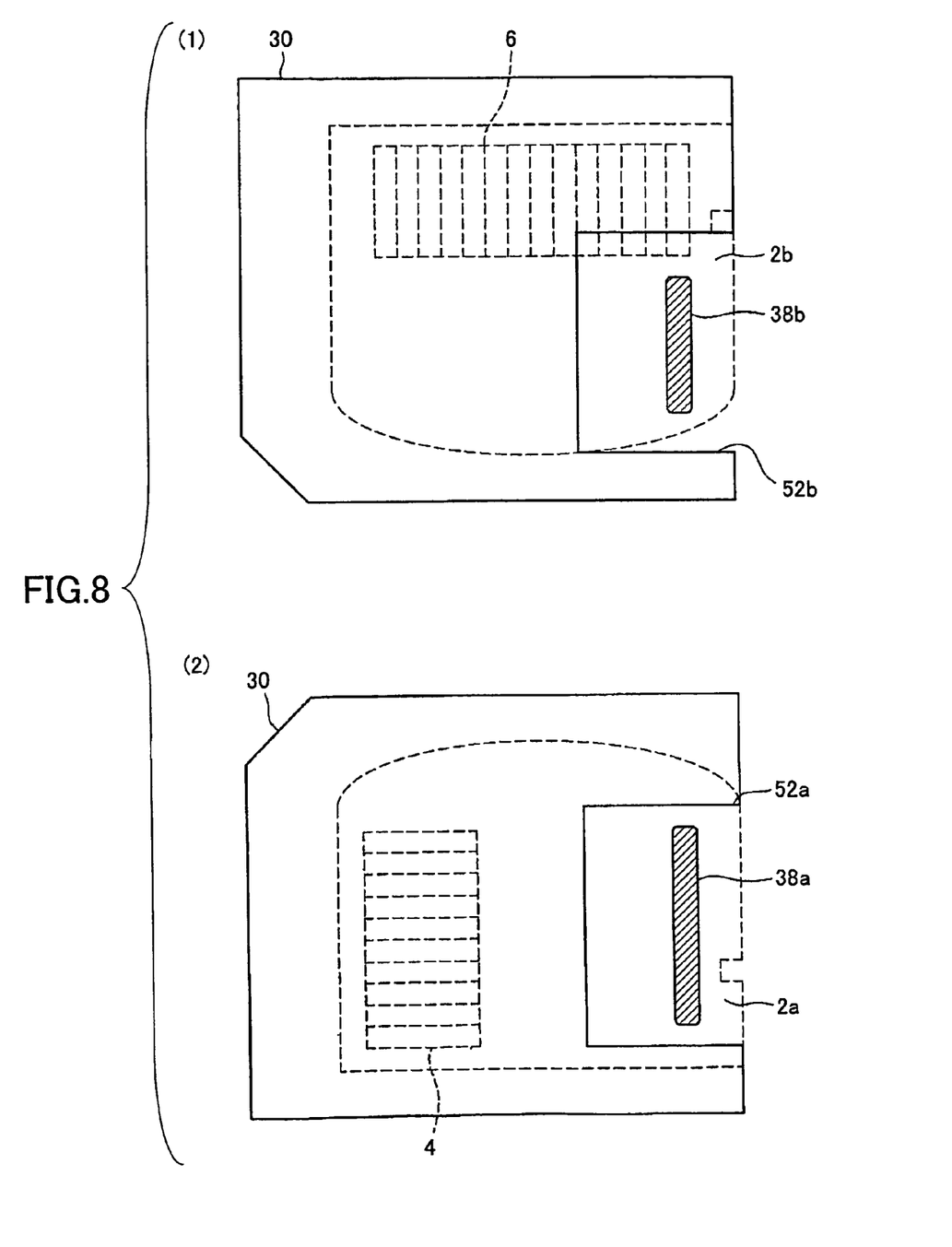
FIG. 8 is a view of an SD card conversion adapter having a configuration whereby the claw hook concave part shown in FIG. 7 is effectively used.

FIG. 8 shows the SD card conversion adapter 30 having a configuration for effectively using the claw hook concave parts 38a and 38b shown in FIG. 7. In the SD card conversion adapter 30 shown in FIG. 8, cut-off parts 52a and 52b are provided so that the claw hook concave parts 38a and 38b are exposed when the nonvolatile memory card is inserted. FIG. 8-(1) shows a lower surface of the SD card conversion adapter 30 and FIG. 8-(2) shows an upper surface of the SD card conversion adapter 30. The cut-off parts 52a and 52b have configurations whereby the claw hook concave parts 38a and 38b and their vicinities are exposed. While FIG. 8 shows the SD card conversion adapter 30, the cut-off part shown in FIG. 8 may be provided in the MS conversion adapter 60.

Second Embodiment

Figure 10:
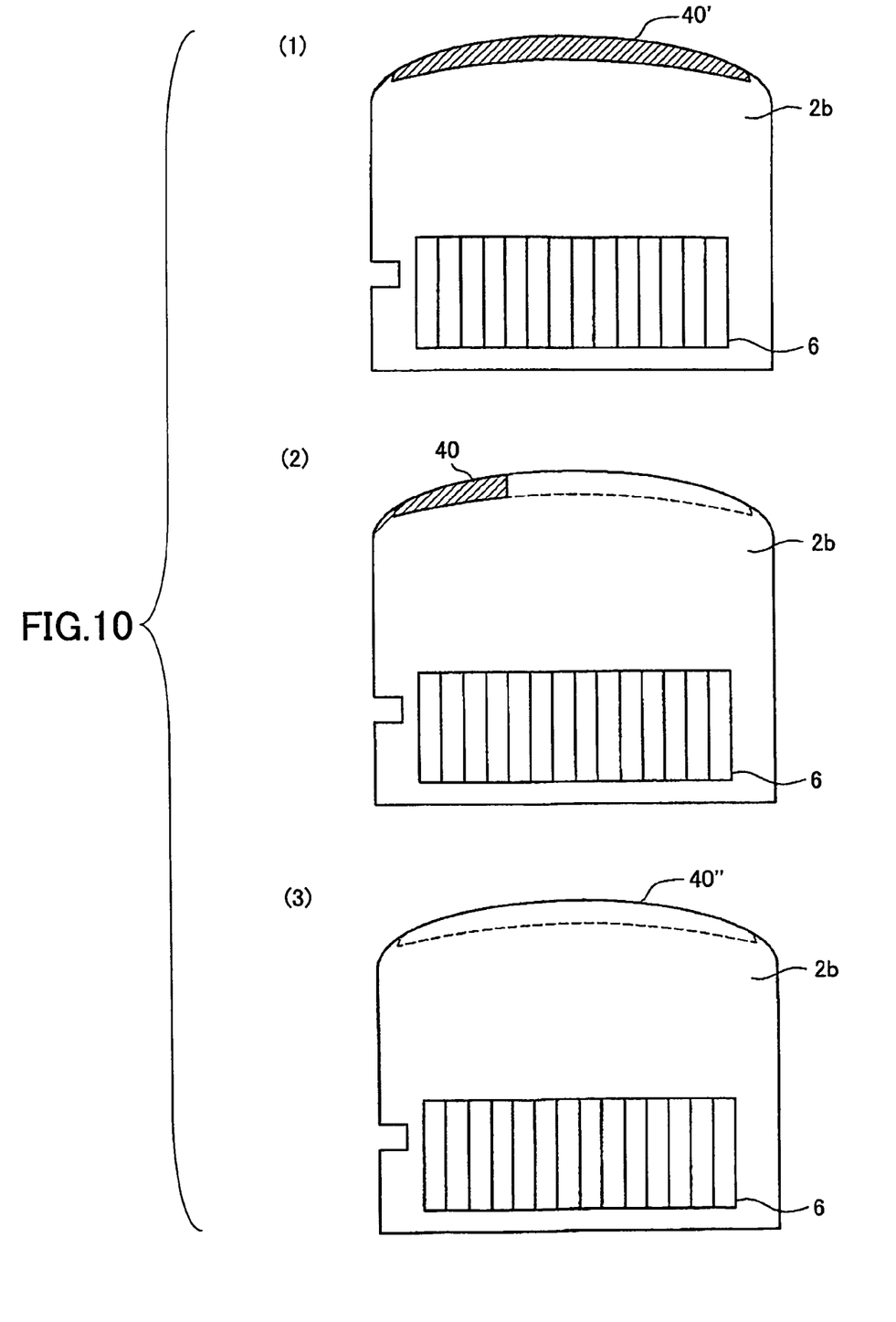
FIG. 10 is a plan view of a nonvolatile memory card of a second embodiment of the present invention.

FIG. 10-(2) is a plan view of the nonvolatile memory card 2 of a second embodiment of the present invention. The memory card of the second embodiment is substantially identical to the memory card of the first embodiment. In the second embodiment, parts that are the same as the parts of the first embodiment are given the same reference numerals, and explanation thereof is omitted.

FIG. 10-(1) is a plan view of a conventional XD card for comparison. In a plane surface of the conventional XD card where the XD interface 6 is provided, the claw hook projection 40' is provided at an edge part facing the edge part where the XD interface 6 exists, as a standard. This claw hook projection 40' supports attachment and detachment of the XD interface 6. If the SD·MS interface 4 shown in FIG. 1 is provided in the memory card having the XD card configuration so that the memory card is inserted in the SD card conversion adapter as shown in FIG. 9-(1), the claw hook projection 40' provided at the XD card as the standard may be an obstacle. Therefore, the cut-off part 50' configured to receive the claw hook projection 40' is provided in the SD card conversion adapter 30 shown in FIG. 12.

Figure 12:
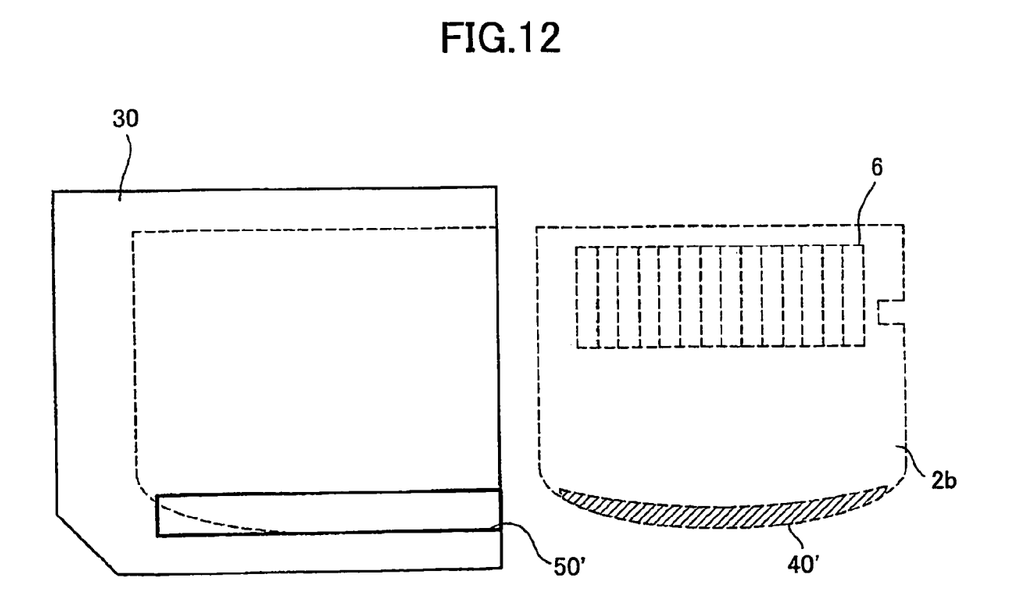
FIG. 12 is a view of an SD card conversion adapter having a cut-off part configured to receive a claw hook projection.
Figure 13:
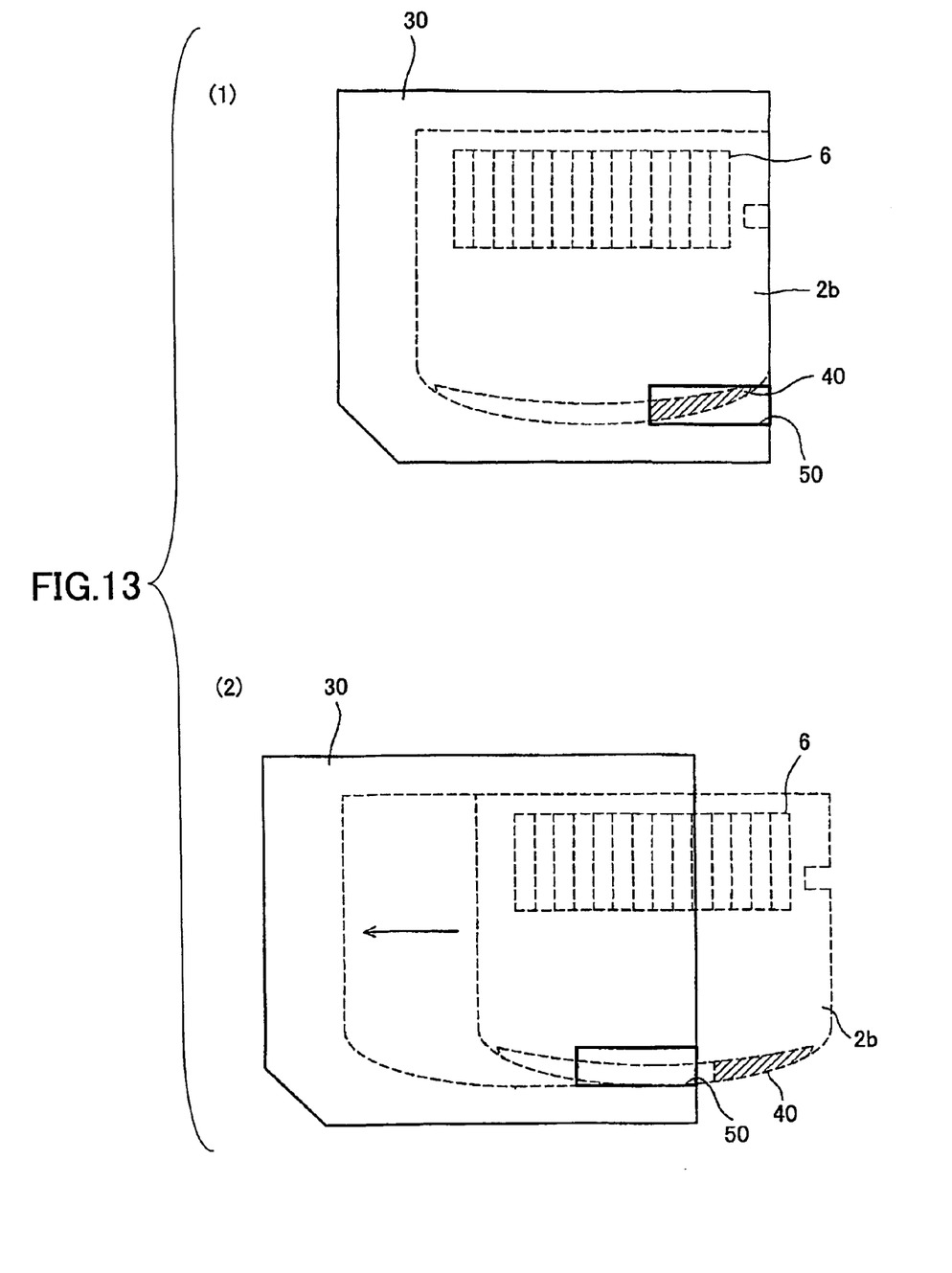
FIG. 13 is a view of the SD card conversion adapter receiving the nonvolatile memory card shown in FIG. 10-(2)

However, in the SD card conversion adapter 30 shown in FIG. 12, since the cut-off part 50' is considerably large, the strength of the SD conversion adapter 30 is degraded. Therefore, in the nonvolatile memory card 2 of the second embodiment of the present invention, as shown in FIG. 10-(2), the size of the claw hook projection 40 is made small. Corresponding to this, in the SD card conversion adapter 30 of the second embodiment of the present invention, as shown in FIG. 13-(1) and FIG. 13-(2), the cut-off part 50 configured to receive the claw hook projection 40 is also made small. FIG. 13-(2) is a bottom view of a state where the nonvolatile memory card 2 has been inserted in the SD card conversion adapter 30. FIG. 13-(1) is a bottom view of a state after the nonvolatile memory card 2 is inserted in the SD card conversion adapter 30.

Since the cut-off part 50 of the SD card conversion adapter 30 shown in FIG. 13 is smaller than the cut-off part 50' shown in FIG. 12, it is possible to prevent the conventional XD card from being inserted, in error, in the SD card conversion adapter 30 of the second embodiment of the present invention.

FIG. 10-(3) is a bottom view of another modified example of the nonvolatile memory card 2 of the second embodiment of the present invention. The claw hook projection is not provided in the nonvolatile memory card 2 shown in FIG. 10-(3). It is not necessary to provide the cut-off part shown in FIG. 11 or FIG. 12 in the SD card conversion adapter (not shown) corresponding to the nonvolatile memory card 2.

Figure 11:
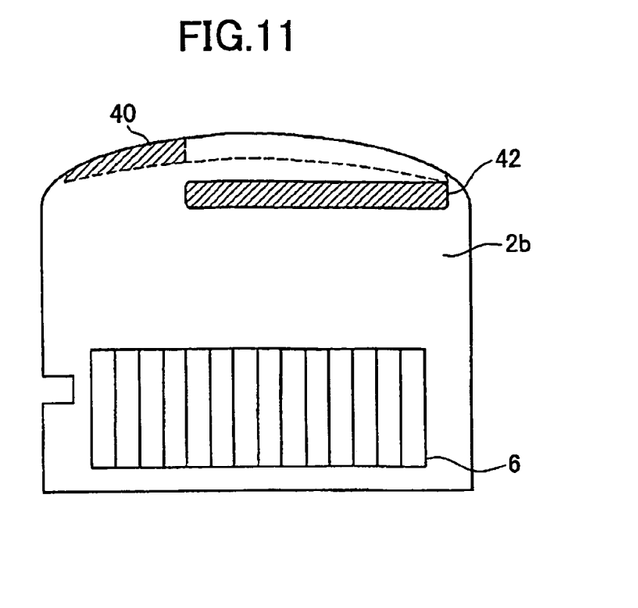
FIG. 11 is a bottom view of another modified example of the nonvolatile memory card of the second embodiment of the present invention.

FIG. 11 is a bottom view of a further modified example of the nonvolatile memory card 2 of the second embodiment of the present invention. If the size of the claw hook projection 40 is made small like the nonvolatile memory card 2 shown in FIG. 10-(2), while the strength of the SD card conversion adapter 30 corresponding to this can be increased, ease and convenience at the time of going in and coming out from the XD card slot is not always improved.

Therefore, in the nonvolatile memory card 2, a concave part 42 is provided in a part where the claw hook projection is removed and in the vicinity of the part. Because of this, ease and convenience at the time when the nonvolatile memory card 2 is pushed into and is pulled out from the XD card slot can be maintained.

Third Embodiment

Figure 14:
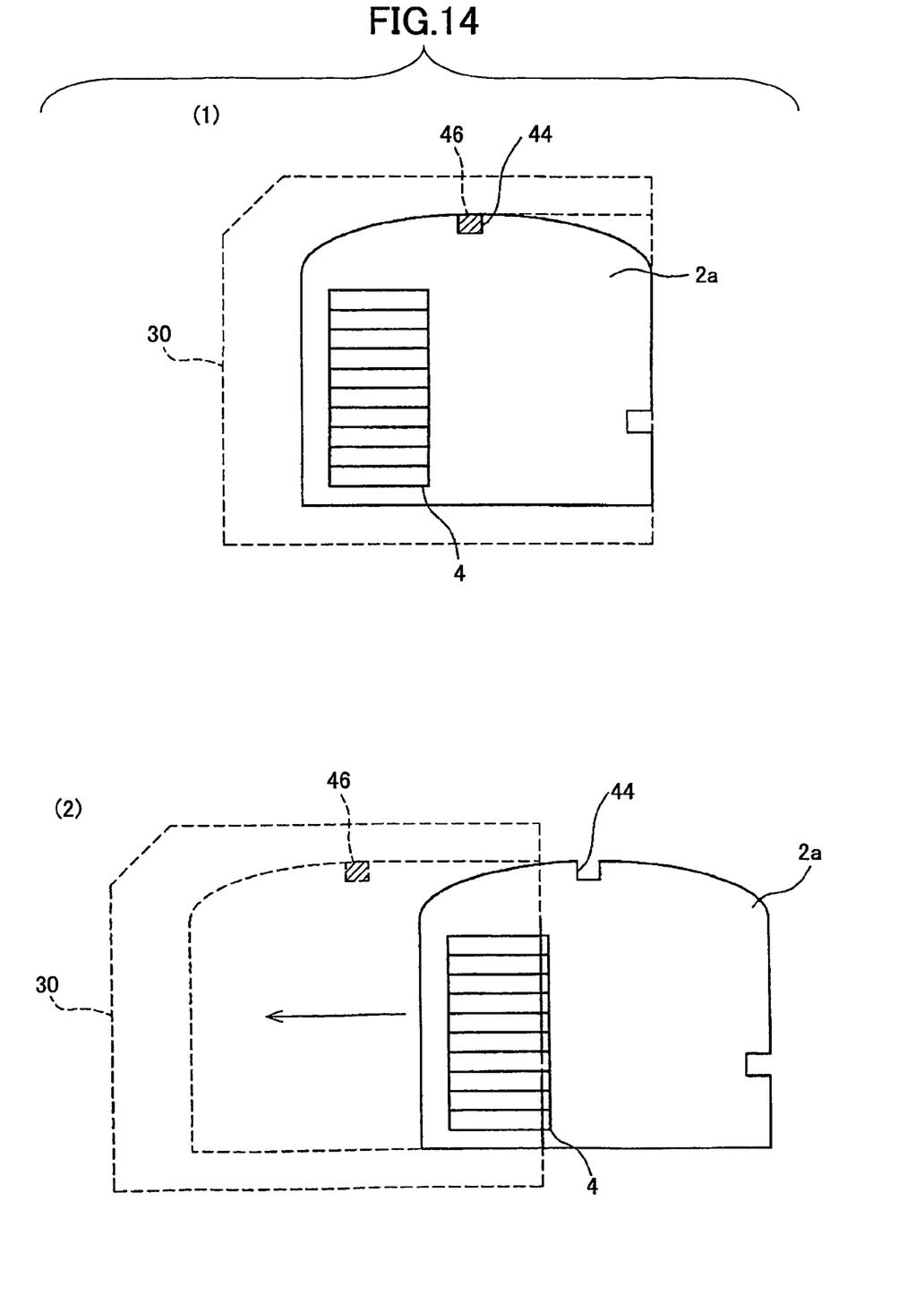
FIG. 14 is a plan view of a nonvolatile memory card of a third embodiment of the present invention.
Figure 15:
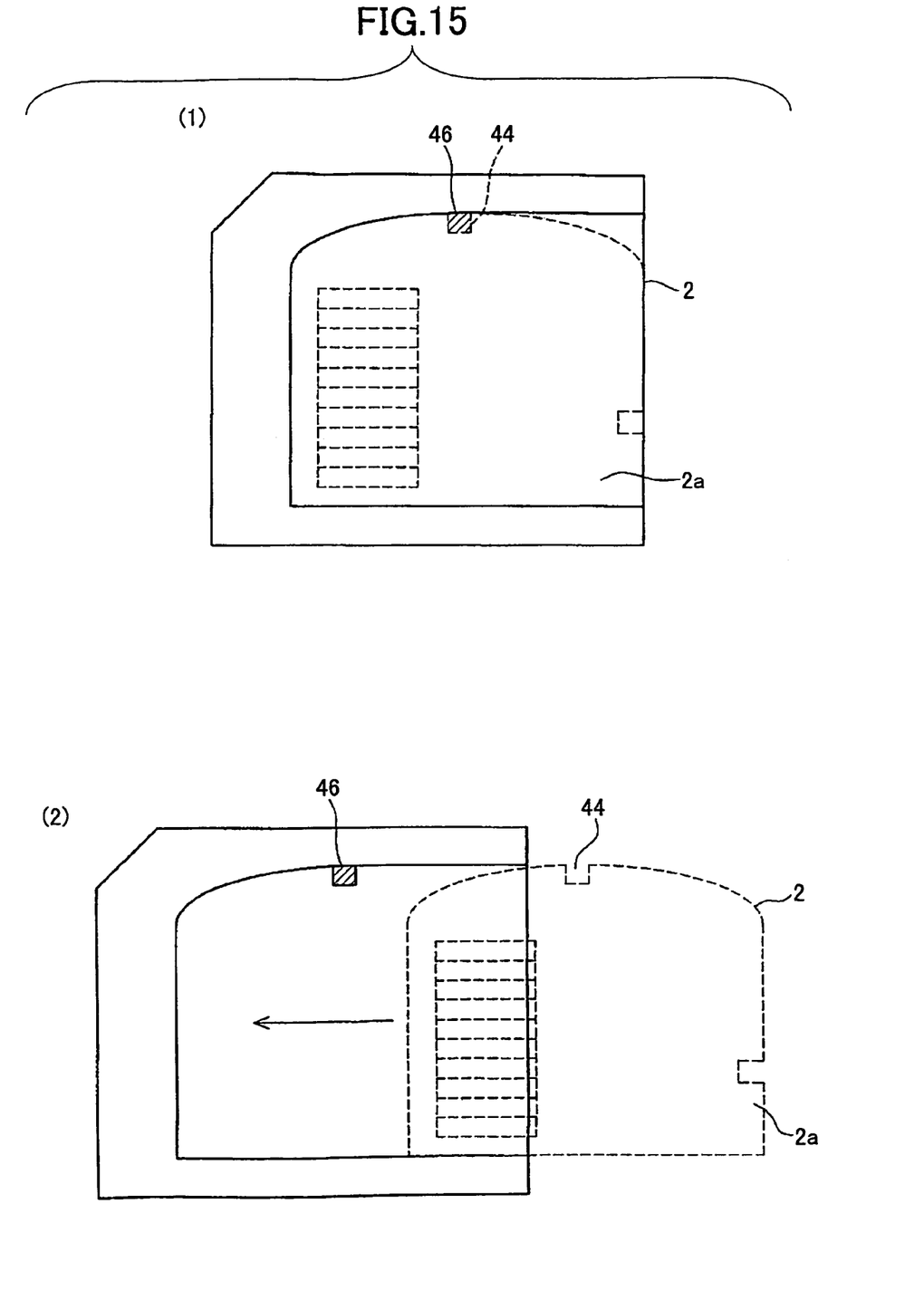
FIG. 15 is a plan view of a configuration conversion adapter of the third embodiment of the present invention.

FIG. 14 is a plan view of a nonvolatile memory card 2 of a third embodiment of the present invention. FIG. 15 is a plan view of a configuration conversion adapter (30, 60) of the third embodiment of the present invention. The memory card of the third embodiment is substantially identical to the memory card of the first embodiment. In the third embodiment, parts that are the same as the parts of the first embodiment are given the same reference numerals, and explanation thereof is omitted.

In the nonvolatile memory card 2 of the third embodiment of the present invention, a concave part 44 is provided so as to prevent relative position shift between the nonvolatile memory card 2 and the configuration conversion adapter (30, 60). The concave part 44 is, as shown in FIG. 14, formed at an edge part coming in contact with an internal side surface of the configuration conversion adapter (30, 60). The stopper 46 is provided at the internal side surface of the configuration conversion adapter (30, 60) so as to correspond to the concave part 44. It is preferable that the stopper 46 have a flexibility and elasticity.

FIG. 14-(2) and FIG. 15-(2) show a state where the nonvolatile memory card 2 has been inserted in the configuration conversion adapter (30, 60). FIG. 14-(1) and FIG. 15-(2) show a state after the nonvolatile memory card 2 is inserted in the configuration conversion adapter (30, 60). When the nonvolatile memory card 2 is inserted in the configuration conversion adapter (30, 60), the stopper 46 having the flexibility and elasticity is engaged with the concave part 44. Because of this, it is possible to prevent the nonvolatile memory card 2 from unintentionally being let out from the configuration conversion adapter (30, 60).

According to the above-discussed embodiments of the present invention, it is possible to provide a nonvolatile memory card, including: interface parts for plural kinds of memory cards; interface controllers corresponding to the interface parts for corresponding memory cards; and a switch configured to select a single one of the interface controllers.

In the nonvolatile memory card, at least a single setting portion of the plural kinds of the interface parts may be hollowed out from a surface of a main body of the memory card. At least a single setting portion of the plural kinds of the interface parts and a part connecting from the setting portion to an edge part may be hollowed out from a surface of a main body of the memory card.

The nonvolatile memory card may further include a protection plate for at least a single one of the interface parts; wherein the protection plate is slid by manual force so that the interface part is exposed or hidden. The nonvolatile memory card may further include a protection plate for at least a single one of the interface parts; wherein the protection plate may be slid by an internal structure of a configuration conversion adapter and may expose the interface when a main body of the memory card is inserted in the configuration conversion adapter; and the protection plate may be energized by the protection plate itself and an upper surface of the main body of the memory card so as to hide the interface when the main body of the memory card is not inserted in the configuration conversion adapter. In the nonvolatile memory card, a concave part may be formed on a surface of a main body of the memory card so that the memory card can be taken in or out of a configuration conversion adapter at the time of use.

According to the above-discussed embodiments of the present invention, it is also possible to provide a configuration conversion adapter, including: a cut-off part configured to expose a claw hook concave part when a nonvolatile memory card is inserted; the nonvolatile memory card including interface parts for plural kinds of memory cards; interface controllers corresponding to the interface parts for corresponding memory cards; and a switch configured to select a single interface controller; wherein at least a single setting portion of the plural kinds of the interface parts is hollowed out from a surface of a main body of the memory card and a concave part is formed on a surface so that the main body of the memory card can be taken in or out of a configuration conversion adapter at the time of use.

According to the above-discussed embodiments of the present invention, it is also possible to provide a configuration conversion adapter, including: a switch selector configured to control a switch of a nonvolatile memory card; the nonvolatile memory card including interface parts for plural kinds of memory cards; and interface controllers corresponding to the interface parts for corresponding memory cards; wherein the switch selects a single interface controller. cards; interface controllers corresponding to the interface parts for corresponding memory cards; and a switch configured to select a single one of the interface controllers.

In the nonvolatile memory card, a concave part may be provided in the vicinity of the claw hook projection so as to assist attachment or detachment using the claw hook projection.

In the nonvolatile memory card, a concave part for a stopper configured to prevent a relative position shift with a configuration conversion adapter may be formed at an edge part coming in contact with an internal side surface of the configuration conversion adapter.

In the nonvolatile memory card, the stopper may be formed at an internal side surface as corresponding to a concave part of a memory card main body.

The present invention is not limited to the above-discussed embodiments, but variations and modifications may be made without departing from the scope of the present invention.

This patent application is based on Japanese Priority Patent Application No. 2005-192054 filed on Jun. 30, 2005, the entire contents of which are According to the above-discussed embodiments of the present invention, it is also possible to provide a configuration conversion adapter, including: a cut-off part configured to receive a claw hook projection for assisting attachment or detachment of an interface part for a certain kind of a memory card; wherein the adapter is used for an interface part for a different kind of the memory card of a nonvolatile memory card; the nonvolatile memory card including: interface parts for plural kinds of memory cards; interface controllers corresponding to the interface parts for corresponding memory cards; and a switch configured to select a single interface controller.

In the nonvolatile memory card, a claw hook projection may be formed as corresponding to a cut-off part of a configuration conversion adapter; the configuration conversion adapter including: the cut-off part configured to receive the claw hook projection for assisting attachment or detachment of an interface part a certain kind of a memory card; wherein the adapter is used for an interface part for a different kind of the memory card of the nonvolatile memory card; the nonvolatile memory card including: interface parts for plural kinds of memory hereby incorporated by reference.

The invention claimed is:

1. A nonvolatile memory card, comprising:
interface parts for plural kinds of memory cards;
interface controllers corresponding to the interface parts for corresponding memory cards;
a switch which selects a single one of the interface controllers; and
a protection plate for at least a single one of the interface parts;
wherein at least a single setting portion of the plural kinds of the interface parts is hollowed out from a surface of a main body of the memory card.

2. The nonvolatile memory card as claimed in claim 1, wherein the protection plate is slid by manual force so that the interface part is exposed or hidden.

3. The nonvolatile memory card as claimed in claim 1, wherein the protection plate is slid by an internal structure of a configuration conversion adapter and exposes the interface when a main body of the memory card is inserted in the configuration conversion adapter; and
the protection plate is energized by the protection plate itself and an upper surface of the main body of the memory card so as to hide the interface when the main body of the memory card is not inserted in the configuration conversion adapter.

4. The nonvolatile memory card as claimed in claim 1, wherein a concave part is formed on a surface of a main body of the memory card so that the memory card can be taken in or out of a configuration conversion adapter at the time of use.

5. A configuration conversion adapter, comprising:
a cut-off part which exposes a claw hook concave part when a nonvolatile memory card is inserted;
the nonvolatile memory card including:
interface parts for plural kinds of memory cards;
interface controllers corresponding to the interface parts for corresponding memory cards; and
a switch which selects a single interface controller;
wherein at least a single setting portion of the plural kinds of the interface parts is hollowed out from a surface of a main body of the memory card, and
a concave part is formed on a surface so that the main body of the memory card can be taken in or out of a configuration conversion adapter at the time of use.

6. A configuration conversion adapter, comprising:
a switch selector which controls a switch of a nonvolatile memory card;
the nonvolatile memory card including:
interface parts for plural kinds of memory cards; and
interface controllers corresponding to the interface parts for corresponding memory cards;
wherein the switch selects a single interface controller.

7. A configuration conversion adapter, comprising:
a cut-off part which receives a claw hook projection for assisting attachment or detachment of an interface part for a certain kind of a memory card;
wherein the adapter is used for an interface part for a different kind of the memory card of a nonvolatile memory card, the nonvolatile memory card including:
interface parts for plural kinds of memory cards;
interface controllers corresponding to the interface parts for corresponding memory cards; and
a switch which selects a single interface controller.

* * * * *